(12) United States Patent
Magner et al.

(10) Patent No.: US 10,947,910 B2
(45) Date of Patent: Mar. 16, 2021

(54) METHOD AND SYSTEM FOR CATALYST FEEDBACK CONTROL

(71) Applicant: Ford Global Technologies, LLC, Dearborn, MI (US)

(72) Inventors: Stephen Magner, Farmington Hills, MI (US); Mario Santillo, Canton, MI (US); Mrdjan Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/405,911

(22) Filed: May 7, 2019

(65) Prior Publication Data
US 2020/0355130 A1    Nov. 12, 2020

(51) Int. Cl.
| | |
|---|---|
| *F02D 35/00* | (2006.01) |
| *F01N 3/20* | (2006.01) |
| *F01N 13/00* | (2010.01) |
| *F02D 41/14* | (2006.01) |
| *F02D 41/02* | (2006.01) |

(52) U.S. Cl.
CPC .......... *F02D 35/0015* (2013.01); *F01N 3/20* (2013.01); *F01N 13/009* (2014.06); *F02D 35/0092* (2013.01); *F02D 41/0235* (2013.01); *F02D 41/1445* (2013.01); *F02D 41/1454* (2013.01); *F02D 2041/141* (2013.01); *F02D 2041/1409* (2013.01)

(58) Field of Classification Search
CPC ............................ F02D 35/0015–0092; F02D 2041/1409–1432; F02D 41/0235; F02D 41/1445; F02D 41/1454; F01N 13/009
See application file for complete search history.

(56) References Cited

U.S. PATENT DOCUMENTS

| | | | | |
|---|---|---|---|---|
| 5,582,150 | A | * | 12/1996 | Reed .................... F02D 41/2458 123/406.47 |
| 6,453,665 | B1 | * | 9/2002 | Bower, Jr. ........... F02D 41/1441 60/274 |
| 6,546,720 | B2 | | 4/2003 | van Nieuwstadt |
| 6,691,507 | B1 | * | 2/2004 | Meyer ................... F01N 11/002 60/274 |
| 8,255,066 | B2 | | 8/2012 | Boiko et al. |
| 9,359,967 | B2 | | 6/2016 | Santillo et al. |
| 10,267,202 | B2 | | 4/2019 | Magner et al. |
| 2003/0023328 | A1 | * | 1/2003 | Yasui ................. G05B 13/0255 700/28 |
| 2003/0140617 | A1 | * | 7/2003 | Yasui .................. F02D 41/1403 60/276 |
| 2004/0050034 | A1 | | 3/2004 | Yasui |
| 2004/0187479 | A1 | | 9/2004 | Surnilla et al. |
| 2013/0192211 | A1 | * | 8/2013 | Nakano .................. F01N 9/005 60/276 |

(Continued)

*Primary Examiner* — Laert Dounis
(74) *Attorney, Agent, or Firm* — Geoffrey Brumbaugh; McCoy Russell LLP

(57) ABSTRACT

Methods and systems are provided for catalyst control. In one example, a method may modulate a downstream catalyst by applying a square waveform to an outer feedback control loop. A fuel adjustment is performed in accordance with the square waveform to create an air-fuel ratio oscillation at an upstream catalyst brick and at a downstream catalyst brick.

19 Claims, 8 Drawing Sheets

(56) References Cited

U.S. PATENT DOCUMENTS

2014/0069097 A1* 3/2014 Yasui ................. F02D 41/0052
  60/615
2018/0094563 A1 4/2018 Magner et al.
2020/0025056 A1* 1/2020 Bagnasco ........... F02D 41/1456

* cited by examiner

METHOD AND SYSTEM FOR CATALYST FEEDBACK CONTROL

FIELD

The present description relates generally to methods and systems for controlling an air-fuel ratio (AFR) in a mid-bed region of a catalyst in an engine exhaust system.

BACKGROUND/SUMMARY

A vehicle may include an emission control system with a three-way catalyst (TWC) for treating exhaust gases of an internal combustion engine and minimizing regulated emissions. A combination of feedforward scheduling and feedback control may be applied to regulate an engine's air-fuel ratio so that engine exhaust constituents may be adjusted in a way that improves catalyst efficiency. Some vehicles may include a universal exhaust gas oxygen (UEGO) sensor positioned upstream of the TWC and a heated exhaust gas oxygen (HEGO) sensor positioned downstream of the TWC to control the AFR near stoichiometry. The UEGO sensor provides feedback to adjust engine out gases about stoichiometry. The HEGO sensor provides feedback to bias the engine air-fuel ratio richer or leaner to improve catalyst efficiency.

Some emissions after-treatment systems can be complex, consisting of several catalyst bricks in series to process each exhaust gas stream (e.g., two streams for a "V" bank type engine versus one stream for an in-line engine). Each catalyst brick may have different precious metal content and specialized oxygen storage coatings to optimize trade-off between cost and emission reduction. During catalyst management, the air-fuel ratio of feed-gas located before the first catalyst brick in the exhaust stream may be modulated to stimulate the brick's front face catalytic activity.

One example approach for catalyst feedback control is shown by Magner et al. in U.S. Pat. No. 10,267,202. Therein, fuel injection to a cylinder is adjusted responsive to sensor feedback from downstream of a catalyst volume based on control parameters. In particular, an oscillation in air-fuel ratio downstream of a first catalyst brick is induced by controlling an inner feedback loop via a relay function while an outer feedback control loop reaches feedback control instability. Other modes of operation schedule modulation of AFR, (e.g., deliberate oscillations versus those arising from feedback) that avoid both instability and adding disturbances to the sensor feedback.

However the inventors herein have recognized potential issues with such approaches. As one example, while the method of Magner is able to stimulate the front brick's catalytic activity, the modulation is not likely to penetrate and activate the second brick. In particular, since the feedback control loop monitors the upstream brick, the downstream brick may only be active during transient and moderate-to-high mass flows. As a result, the system is unable to realize the full potential of the downstream catalyst.

In one example, the above issues may be addressed by a method for catalyst control that focuses on the portion of the catalyst management that schedules the air fuel ratio (AFR) intended after the first catalyst brick has processed the exhaust gas to further promote catalytic activity in the further downstream brick. Several exhaust gas sensors may be placed in the catalyst system, such as one before the first brick and another, referred to as a catalyst monitoring sensor (CMS), placed between the two bricks in a mid-bed (MB) location. AFR may first be modulated to stimulate the first brick's front face catalytic activity. Then, another layer of modulation may be imposed upon the first modulation to create an AFR modulation between the bricks to better activate the downstream brick, without compromising the modulation of the first brick. One example method for modulating a downstream catalyst comprises: during steady mass flow conditions, adjusting a cylinder air-fuel ratio responsive to a first exhaust gas sensor upstream of a first and a second three-way catalyst, and a second exhaust gas sensor between the first and the second catalyst, including introducing modulation to a reference set-point compared with feedback from the second sensor, at a frequency slower than modulation measured from feedback from the first sensor.

As one example, air-fuel ratio upstream of a first (upstream) catalyst brick may be controlled via an inner feedback loop, and air-fuel ratio in a mid-bed region between the first catalyst brick and a second catalyst brick, positioned downstream, may be controlled via an outer feedback loop. The inner feedback loop may receive feedback from a wide-band oxygen sensor that senses feed gas (FG) conditions, such as an UEGO sensor placed upstream of the first catalyst brick. Control parameters of the outer feedback loop may be tuned via a feed-forward component that induces small AFR biases (or offsets) from stoichiometry as a function of engine speed, load, and (first) catalyst temperature. Alongside the applied biases, fuel injection control is performed in an open loop manner as a function of the estimate of inducted air mass flow, thereby generating a desired exhaust gas mixture at the upstream catalyst brick. Then, a periodic signal is generated, such as in the form of a square wave, that modulates the bias command delivered to the inner loop controller at an amplitude and frequency that acts on the front face of the first brick, but is weak enough that as the AFR signal passes through the brick, it is attenuated to a very low level that does not disturb the outer control loop when the exhaust gas reaches a CMS in the mid-bed region.

An additional modulation signal can be introduced whereby the two modulated control signals, generated from one original signal for a desired exhaust set-point, may work simultaneously to increase the activity of the front face of a first catalyst brick and that of a second, downstream catalyst brick. By varying the amplitude and period of the two signals, a slower, smaller amplitude signal directed to a mid-bed region of the catalysts may be effectively "carried" by the faster signal directed to the first brick. The slower modulation may be able to penetrate deeper into the first brick and arrive at the mid-bed region where the exhaust gas may then work through the downstream brick such that little to no amplitude of the signal remains upon exiting the second catalyst brick. The technical effect of spreading out downstream catalyst modulation is that the needed amplitude deviation when adjusting cylinder fuel injection is limited which, if not contained, could induce small but noticeable torque deviations in combustion, creating unacceptable noise, vibration, and harshness (NVH).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
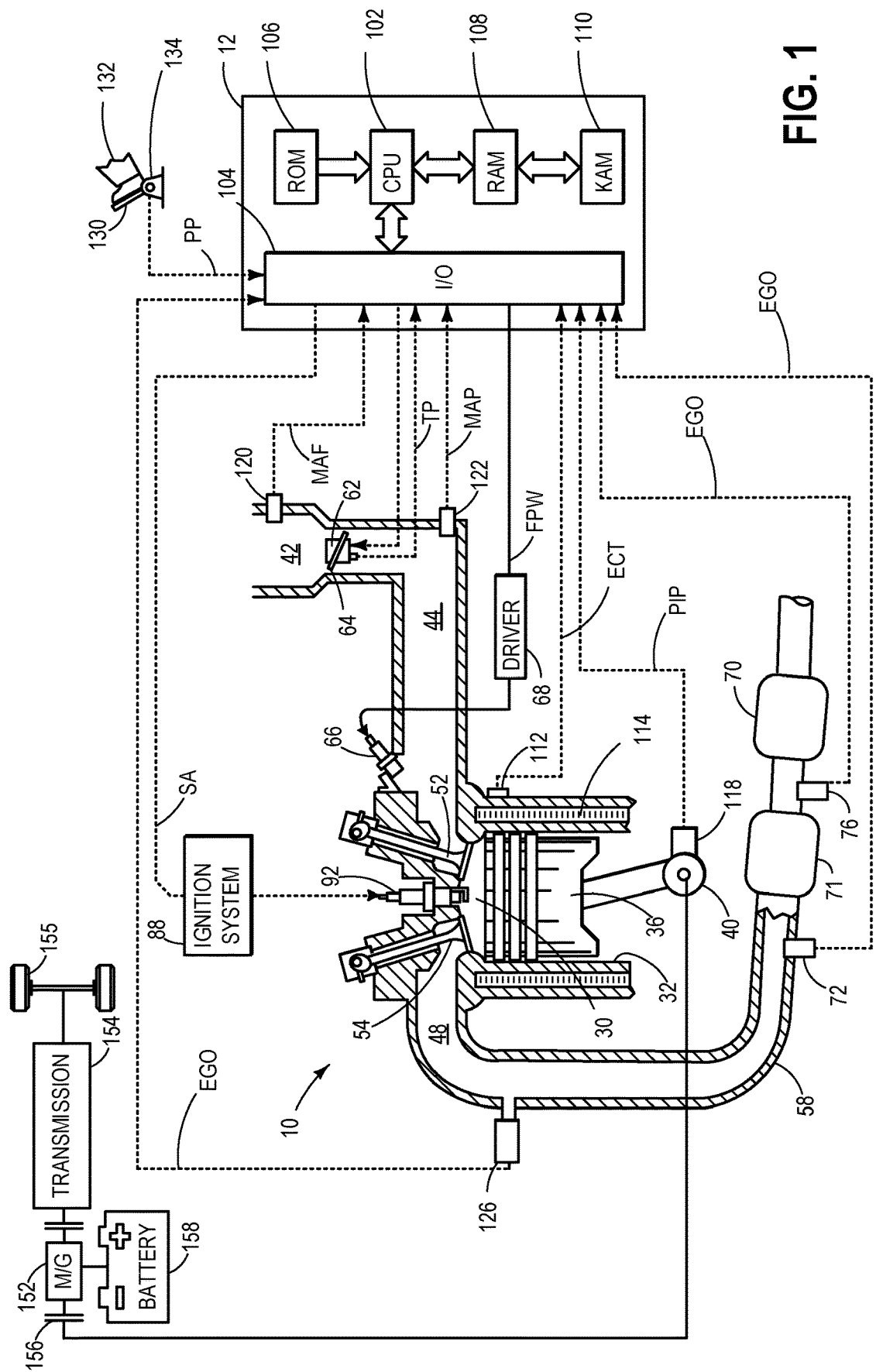
FIG. 1 shows a block diagram of an example engine system coupled in a hybrid electric vehicle.
Figure 9:
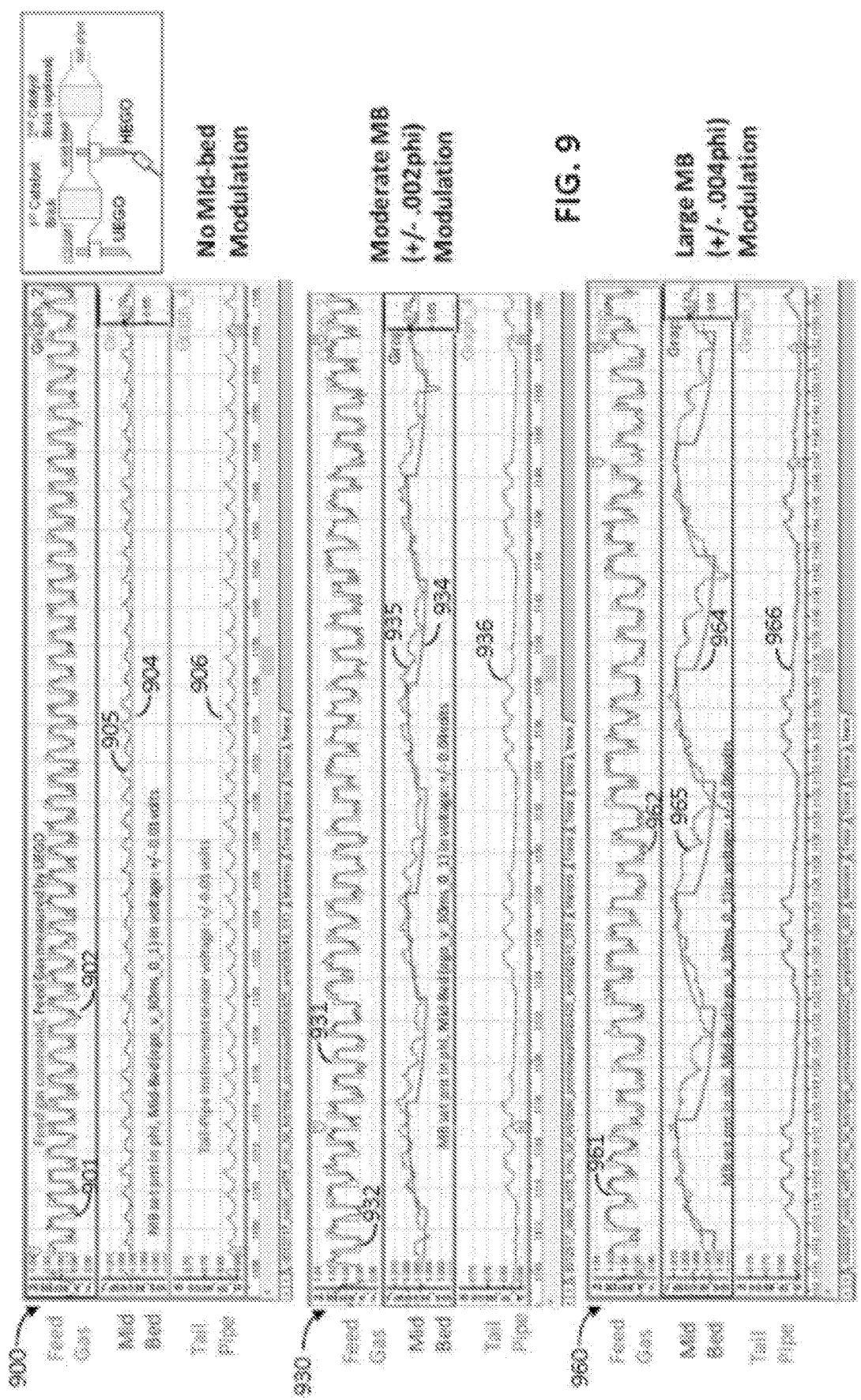
FIG. 9 illustrates example methods and levels of mid-bed modulation.
Figure 10:
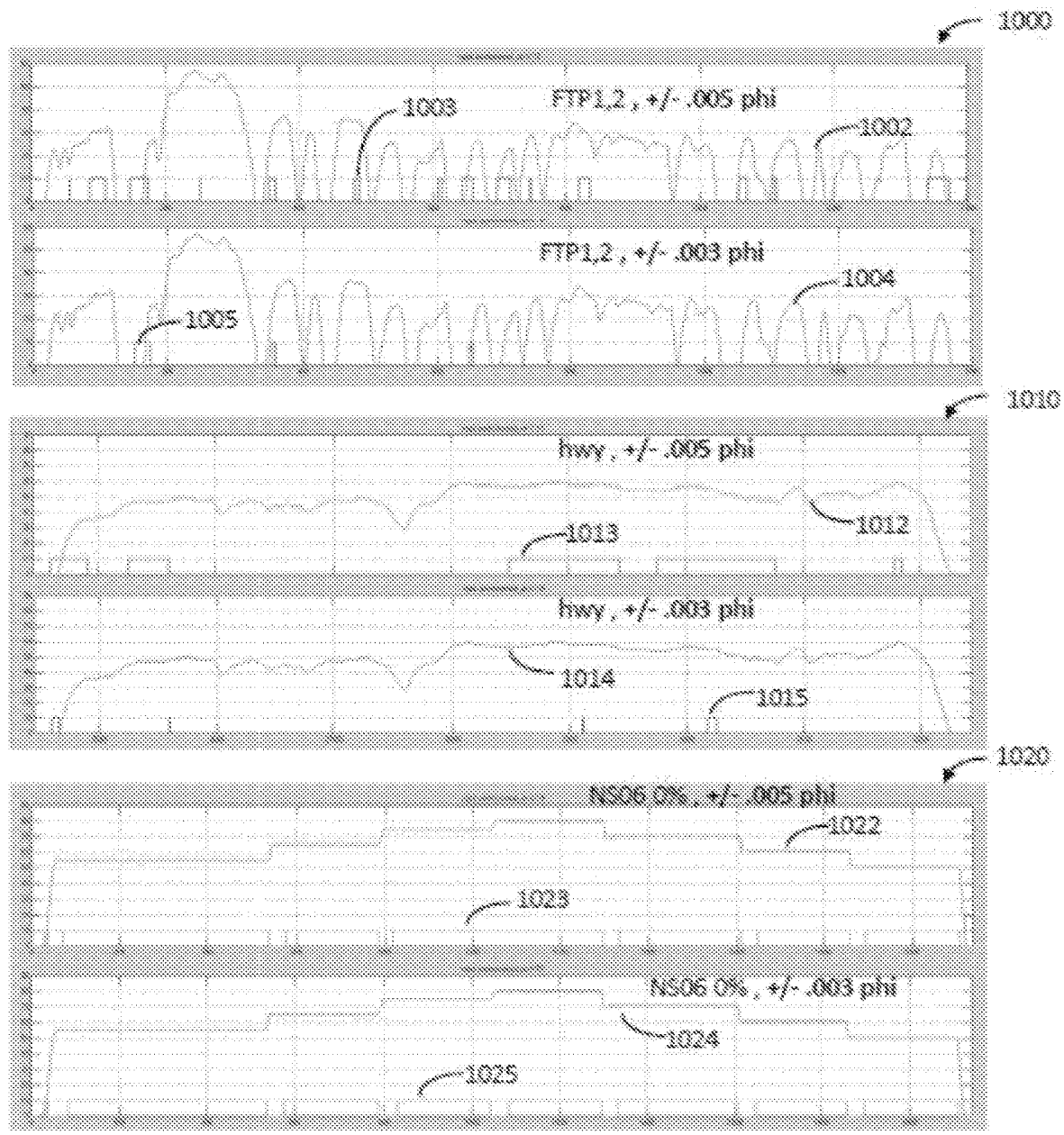
FIG. 10 depicts prophetic examples of initiation of mid-bed modulation during different vehicle drive conditions.

The following description relates to systems and methods for managing operation of an exhaust catalyst by controlling the air-fuel ratio in a mid-bed region between exhaust catalyst bricks. FIG. 1 shows an example engine system in which catalyst control via air-fuel ratio modulation can be enabled. Catalyst control may be achieved via an inner and an outer control loop, which enable the front face of both an upstream and a downstream brick to be activated. This is achieved by the addition of another modulation layer introduced in FIG. 3 as compared to the control loop of FIG. 2 which is intended to activate only an upstream brick. A controller may be configured to perform a control routine, such as the example routine of FIG. 4, to initiate catalyst control including modulation of a mid-bed region during selected drive cycles where the engine is operating at near steady-state. Additional implementation details of the method of FIG. 4 is shown via the methods of FIGS. 5-8. Example normalized fuel air ratio (FAR) waveforms and the corresponding levels of mid-bed modulation are shown at FIG. 9. An example of enabled modulation for mid-bed catalyst stimulus on different vehicle drive cycles is shown at FIG. 10. In this way, exhaust catalyst activation is improved, increasing the potential use of a downstream catalyst brick.

Turning to FIG. 1, a schematic diagram of one cylinder of multi-cylinder engine 10, which may be included in a propulsion system of a vehicle 5, is shown. In the depicted example, the vehicle 5 is configured for on-road propulsion. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber 30 (also termed, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown arranged in intake manifold 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 coupled upstream of throttle 62 for measuring the flow rate of aircharge entering into the cylinder through throttle 62. Intake passage 42 may also include a manifold air pressure sensor 122 coupled downstream of throttle 62 for measuring manifold air pressure MAP.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 58 upstream of emission control device 70. Sensor 126 may be any suitable sensor for providing an indication of exhaust gas air-fuel ratio such as a linear oxygen sensor or UEGO (universal or wide-range exhaust gas oxygen), a narrow band (older systems treat as a two-state device) oxygen sensor or EGO, a HEGO (heated EGO), a NOx, HC, or CO sensor. Emission control devices 71 and 70 are shown arranged along exhaust passage 58 downstream of exhaust gas sensor 126. The first emission control device 71 is upstream of the second emission control device 70. Devices 71 are 70 may be three way catalyst (TWC), NOx trap, various other emission control devices, or combinations thereof. Exhaust gas sensor 76 is shown coupled to exhaust passage 58 downstream of the first emission control device 71 in a mid-bed region. Sensor 76 may be any suitable sensor for providing an indication of exhaust gas air/fuel ratio such as a linear oxygen sensor or UEGO (universal or wide-range exhaust gas oxygen), a narrow band oxygen sensor or EGO, a HEGO (heated EGO), a NOx, HC, or CO sensor. Sensor 76 may also be referred to herein as a catalyst monitoring sensor or CMS. In another embodiment, emission control device 71 and 70 may be combined into one single device with two separate volumes, and a mid-bed sensor may be positioned between the two volumes within the emission control device to detect air-fuel ratio in the middle of the catalyst.

Other sensors 72 such as an air mass flow (AM) and/or a temperature sensor may be disposed upstream of the first emission control device 71 to monitor the AM and temperature of the exhaust gas entering the emission control device. The sensor locations shown in FIG. 1 are just one example of various possible configurations. For example, the emission control system may include one emission control device with a partial volume set-up with close coupled catalysts.

Controller 12 is shown in FIG. 1 as a microcomputer, including microprocessor unit 102, input/output ports 104, an electronic storage medium for executable programs and calibration values shown as read only memory 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; air mass and/or temperature of the exhaust gas entering the catalyst from sensor 72; exhaust gas air-fuel ratio post-catalyst from sensor 76; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses for each revolution of the crankshaft. Additionally, controller 12 may communicate with a cluster display device 136, for example to alert the driver of faults in the engine or exhaust after-treatment system.

Storage medium read-only memory 106 can be programmed with computer readable data representing instructions executable by processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, adjusting fuel injection may include adjusting pulse width signal FPW to electronic driver 68 to adjust the amount of fuel injected to the cylinder.

In some examples, vehicle 5 may be a hybrid vehicle with multiple sources of torque available to one or more vehicle wheels 155. In other examples, vehicle 5 is a conventional vehicle with only an engine, or an electric vehicle with only electric machine(s). In the example shown, vehicle 5 includes engine 10 and an electric machine 152. Electric machine 152 may be a motor or a motor/generator. Crankshaft 140 of engine 10 and electric machine 152 are connected via a transmission 154 to vehicle wheels 155 when one or more clutches 156 are engaged. In the depicted example, a first clutch 156 is provided between crankshaft 140 and electric machine 152, and a second clutch 156 is provided between electric machine 152 and transmission 154. Controller 12 may send a signal to an actuator of each clutch 156 to engage or disengage the clutch, so as to connect or disconnect crankshaft 140 from electric machine 152 and the components connected thereto, and/or connect or disconnect electric machine 152 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 152 receives electrical power from a traction battery 158 to provide torque to vehicle wheels 155. Electric machine 152 may also be operated as a generator to provide electrical power to charge battery 158, for example during a braking operation.

During emission control of a spark ignition engine, such as the engine system of FIG. 1, exhaust catalyst operation needs to be managed to minimize regulated emissions. As described at FIG. 1, the emissions after-treatment system can be complex, consisting of several catalyst bricks in series to process each exhaust gas stream (such as 2 streams for "V" bank type engines versus 1 stream for in-line engines). Each brick (such as the bricks for emission control devices 70 and 71) may be configured with different precious metal content and specialized oxygen storage coatings to optimize trade-off between cost and emission reduction.

Figure 2:
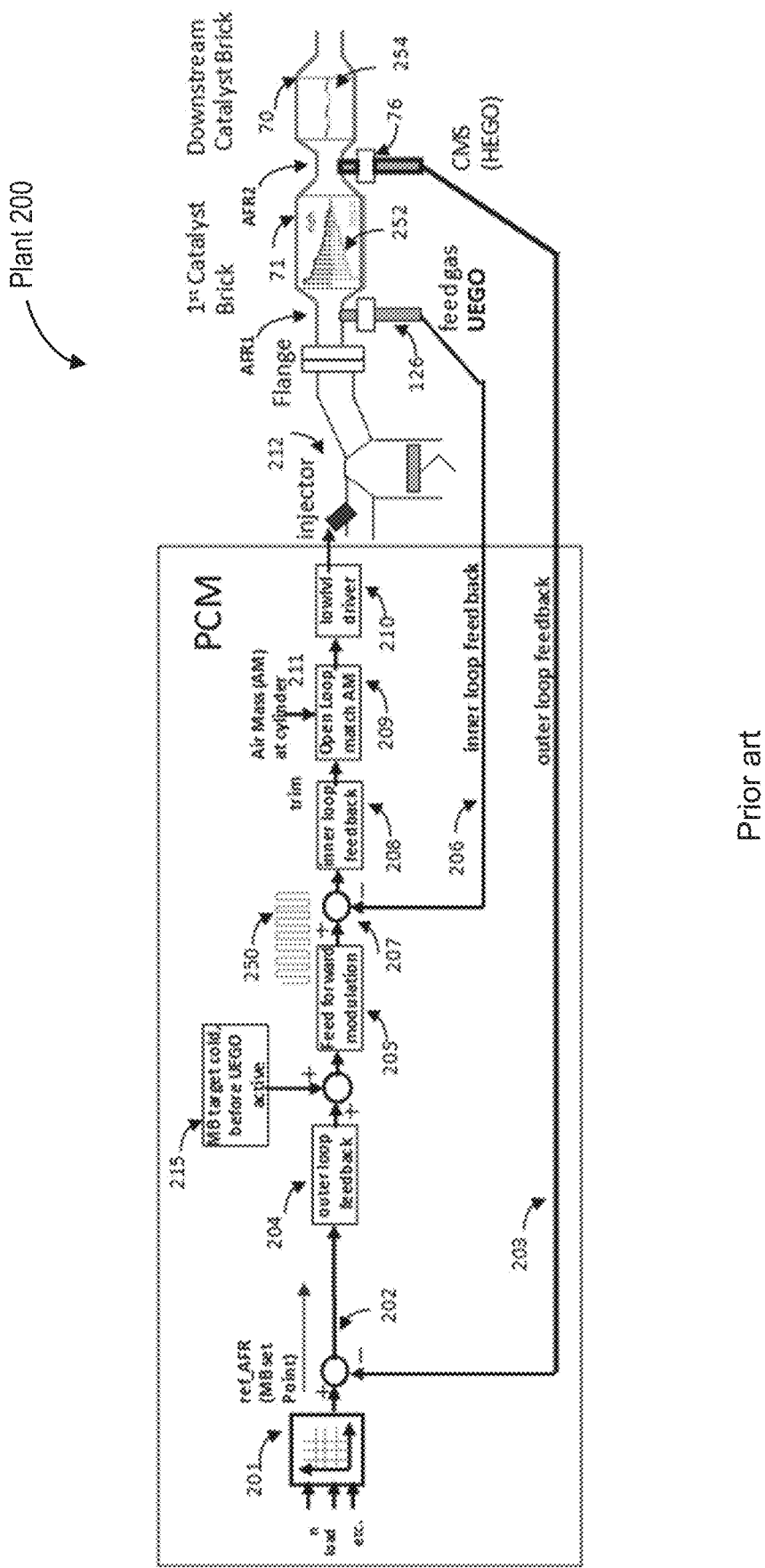
FIG. 2 is a high level block diagram demonstrating an example catalyst control system that is limited to a first, front brick modulation.

Engine controllers may use a combination of feedforward scheduling and feedback control loops to deliver catalyst efficiency. One such control approach, as may be used in the prior art, is shown at FIG. 2. Therein, through the use of an inner and an outer control loop, each of which relies on feedforward and feedback data, the controller may schedule an air fuel ratio (AFR) intended at the first catalyst brick such that the exhaust gas flowing through the first catalyst brick promotes the catalytic activity of the brick.

The location before the first brick in the exhaust stream, sometimes referred to as feed-gas (FG), is often modulated in AFR to stimulate the first brick's front face catalytic activity. The modulation will penetrate into the brick, but will diminish in amplitude as the exhaust gas reaches the end of the brick. The modulation of AFR alternatively provides small deviations from stoichiometric AFR where a slightly reductant biased (rich) CO combustion by product alternates with slightly oxidized (lean) combustion ($O_2$ and NOx). The catalyst acts on these by-products and becomes hotter and more efficient. As measured at the end of the first brick, the modulation can reduce more emissions than if the modulation was not employed. While natural deviations in AFR can occur due to active driving that cause large swings in mass flow in the exhaust system, these deviations may be vehicle drive dependent, and therefore are not reliable or consistent. A deliberate modulation can foster lower variability. The amplitude and frequency of the modulation imposed are often limited due to the Noise Vibration Harshness (NVH) that that can exist as a secondary effect.

However, one potential issue with the approach of FIG. 2 is that it is not intended to promote activity of the downstream catalyst brick. As a result, the potential of the downstream catalyst is not realized. On the other hand, if the single frequency modulation is adjusted to increase the activity of the downstream catalyst, it may be at the cost of the activity of the upstream catalyst. The upstream brick, especially its front face, is loaded with higher concentrations of precious metal that should be exercised by a changing mix of oxidants and reductants to stay active and hot. In order to reach deeper into the catalyst path, either larger amplitude oscillations are needed, which will result in NVH, or smaller oscillations can be used but must be sustained longer (larger period, i.e. lower frequency), with fewer conversions on the front face of the upstream brick, resulting in less front brick activity.

Figure 3:
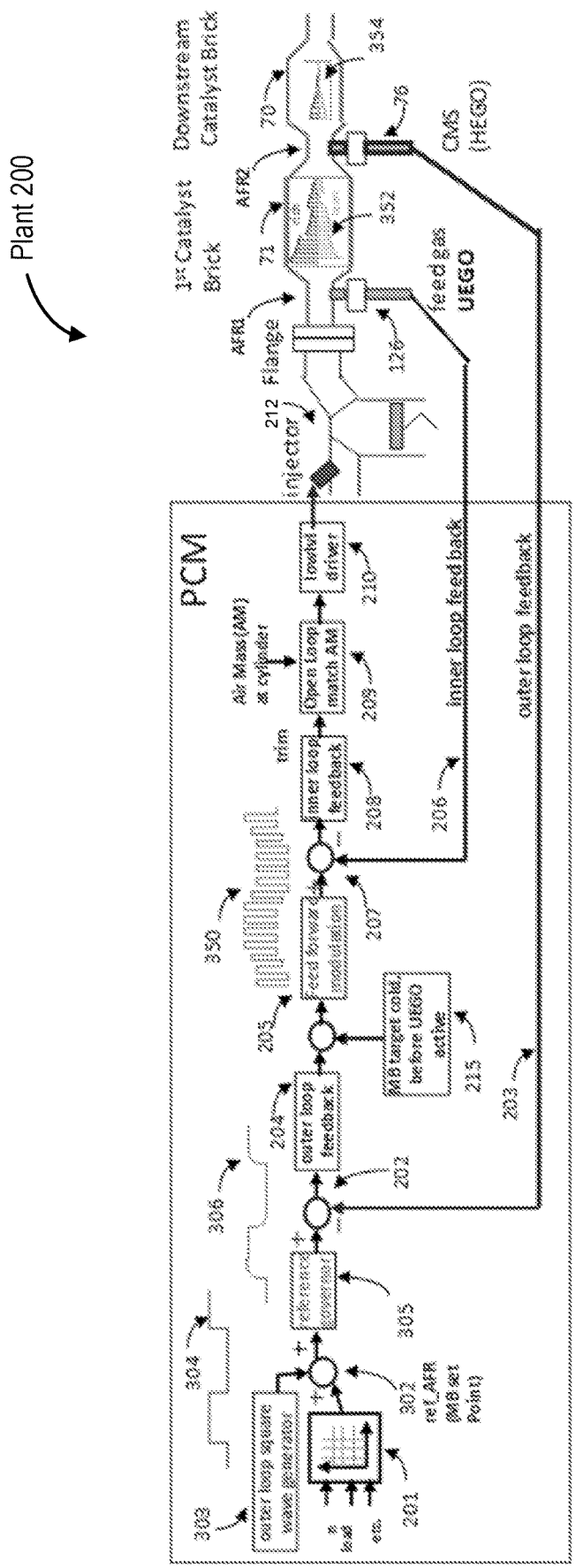
FIG. 3 is a high level block diagram demonstrating an example catalyst control system that provides front brick and downstream brick modulation.
Figure 4:
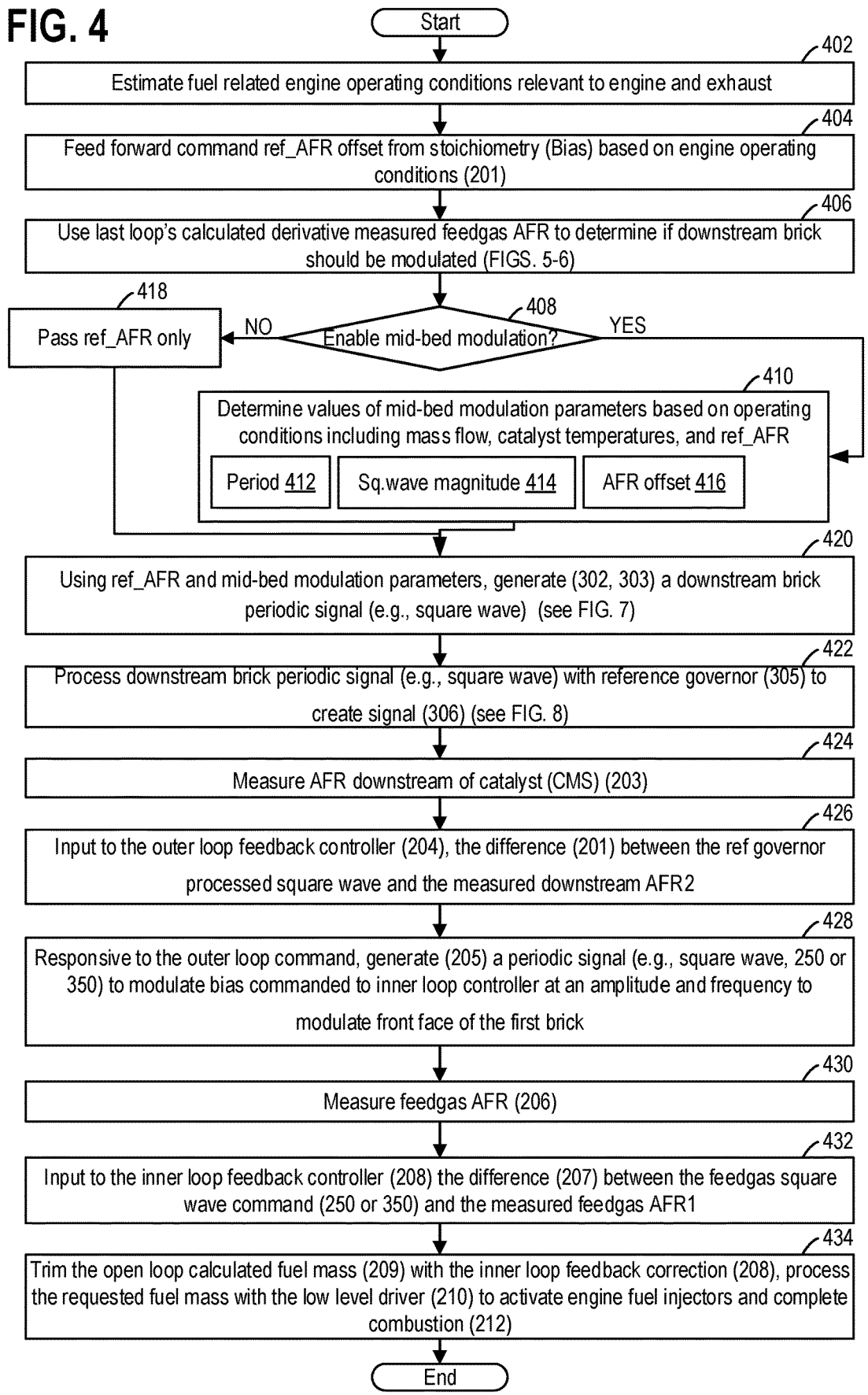
FIG. 4 shows a flow chart demonstrating an example method of catalyst control including mid-bed (downstream) modulation during selected conditions, in accordance with the block diagram of FIG. 3.

A modified catalyst control method is depicted at FIG. 3 that modulates the activity of both the upstream and the downstream bricks. The approach of FIG. 3 focuses on the portion of the catalyst management that schedules the air fuel ratio (AFR) intended after the first catalyst brick has processed the exhaust gas to further promote catalytic activity in the further downstream brick.

Turning first to FIG. 2, a high level block diagram demonstrating an outer feedback loop 203 and an inner feedback loop 206 for catalyst control is shown. The inner feedback loop may include inner loop controller 208, open loop controller 209, engine 212, an UEGO sensor 126, and a transfer function 206 that converts sensor signal to AFR. The outer feedback loop may include outer loop controller 204, a HEGO 76, and a transfer function 203 that converts sensor voltage to AFR, and an inner feedback loop. The outer loop controls air-fuel ratio (AFR) downstream of the first catalyst or the first catalyst volume 71 via the outer loop controller 204. The inner loop controls AFR upstream of the first catalyst.

Controller (such as controller 12 in FIG. 1) may send a reference AFR (ref_AFR) signal to the outer feedback loop. The reference AFR may be a desired AFR downstream of the first catalyst. Difference between ref_AFR and measured AFR downstream of the first catalyst AFR2 may be sent as an error signal to outer loop controller 204 which produces a correction that the inner loop feedback (208) will act on. However, the outer loop controller 204 correction is first passed through a feed forward modulation block (205), which produces a fast square wave modulation. The 250 square wave amplitude and period create higher activation in the front brick, but do not reflect the control correction. The 250 square wave introduces the correction by shifting the square wave up or down (lean/rich) or by making the square wave asymmetric in duration (dwelling either more high or low). The difference between the output from outer loop controller and AFR measured upstream of the first catalyst AFR1 may be calculated and sent to inner loop controller 208. Open loop controller 209 may include a first input receiving output of inner loop controller 208, and a second input 211. As an example, input 211 may be cylinder air charge determined based on torque demand. As another example, input 211 may be inducted air mass. The open loop controller may account for controller (12) compensations including canister purge and cold engine fueling. The open loop compensations give the closed loop system a head start and allow the inner loop controller to only have to trim errors that are not expected. Open loop controller 209, operates in several stages, first accounting for each engine bank control, and then later directing cylinder specific fueling, creating an output signal sent to low level injector driver 210, wherein the signal may indicate the fuel injection amount. As an example, the signal may be a fuel pulse width signal (FPW). In response to the signal, engine 212 outputs exhaust gases with AFR of AFR1. Exhaust gases may travel through the first catalyst 71 and changed to an AFR of AFR2.

In this way, FIG. 2 provides a conceptual diagram of the operation of a typical exhaust catalyst control system. The left half blocks are the controller sub-systems that interact with the right half essential physical components. Starting from the left, at 201, a set point of AFR bias appropriate at the mid-bed location is determined, based on current conditions of the engine such as engine speed and normalized air flow (load), but may be further modified by other estimated parameters such as fuel composition (gasoline-ethanol mix), catalyst temperatures, etc. The set point is compared to an estimate of AFR from the CMS, generating an error at 202 that then is used by an outer loop feedback controller 204, which could be some form of PID or other dynamic correction.

If the feedback is not active, typically due to the AFR sensor or catalyst still warming up, then another purely feed forward command is provided by another portion of the strategy (215) until the feedback is active. This command is then translated into a square wave 250, where its average value corresponds to the command, but its amplitude and period are determined by engine operating conditions that have been mapped from operating the catalyst during development for its best response in terms regulated emissions tradeoffs and limiting NVH. It is possible that amplitude and period selections "breakthrough" the first brick and get good emissions and still acceptable NVH, however the outer loop set point expects to only see the original command and not the additional imposed square wave. Without modification, the outer loop will attempt to suppress the square wave, and if the period is long enough, the slower outer loop control will succeed to some extent in suppressing the square wave 250. Therefore, the fast modulation's amplitude and period are chosen to be small enough to attenuate once reaching the CMS. The square wave proceeds to provide a command to the inner loop controller, which is much faster than the outer loop and will track the square wave 250. The command from the inner loop controller will modify or "trim" the desired fuel mass that is intended to match the inducted air mass reaching the combustion chamber. The trim is what is needed to satisfy the outer loop's command and to reject any disturbances that have been detected by the UEGO in the feed gas. Once appropriately translated into injection commands by a series of low level drivers, the fuel is delivered and combusted in such a way that each bank exhaust stream mimics the AFR commands. Exhaust gas that contains AFR pulses, based on the strategy commands, will reach the front face of the first brick. FIG. 2 conceptually shows the square wave 250 propagate and attenuate as it makes its way through the brick, in the form of wave 252. In other words, the attenuation is due to weakening catalytic activity as the gas travels through the brick, since the needed concentrations of oxidants and reductants are being used up along the path through the catalyst. By the time the square wave 250 reaches the downstream brick, an attenuated wave 254 is created at the downstream catalyst.

This leaves the downstream brick(s) with relatively little to work with, at least for low to moderate mass flow with minimal disturbances due to rapid changes in engine output. The downstream bricks may start to cool to the temperature of the downstream gas rather than the elevated temperature created by emissions conversion. Once the first brick's capacity to convert emissions is exceeded, however, even if only momentarily, a gas mixture that needs treatment will reach the downstream brick, which will eventually heat up and assist the first brick.

In comparison, the approach of FIG. 3 keeps the downstream bricks more active and ready to act when needed. As such, there are various challenges in achieving this. For example, the first brick's activity has to be carefully reduced to allow the latter brick(s) to have something to work with, but not too much since there can be some intermediate time when the latter brick has limited capacity. In other words, the most intense stimulation is still appropriate to the first brick, which is designed and loaded (in precious metals) to light off quickly from an engine start and provide the majority of emission reductions. A slower, more cautious, stimulation of the downstream brick optimizes the use of both bricks' capabilities.

FIG. 3 describes the modified approach. As such, components previously introduced in FIG. 2 are numbered and named the same. The control approach of FIG. 3 includes additional components to assist on downstream catalyst stimulation. In particular, at the place 302 where the offset bias is determined, another square wave 304 is created via an outer loop square wave generator 303. The long period and small amplitude AFR command of the additionally generated wave is less likely to introduce NVH, however the outer loop is relatively slow, so unintended overshoot rich or lean can occur if the loop's dynamics and outer feedback controller's limitations are not taken into account. The reference governor 305 alters the commanded square wave to a filtered square wave 306 to keep AFR overshoot in check. Essentially the command 306 is accommodated as an immediate partial step that can be tracked by the feedback control. The remaining portion of the step is filtered in more slowly to allow the feedback controller to keep up. This action may slightly compromise the downstream catalyst stimulation, but is necessary to maintain stable loop control and remain within NVH limits. Harsh control may also result in larger emissions inefficiencies. The reference governor 305 will "round off" the square wave (see 304 relative to 306) and how much is rounded off will depend on engine operating conditions, but a sufficiently long period will allow the intended square to be approximated well enough.

As the strategy proceeds, the faster modulation is centered about the slower modulation, effectively carrying it along, and resulting in updated square wave 350 (compare this to 250 of FIG. 2). The far right part of FIG. 3 shows the conceptual activity of the bricks. The first brick, often "zone" loaded so that intense activity occurs near the front face, still receives the original amplitude and frequency exhaust gas, albeit with a small rich or lean offset alternating over several fast pulses, as shown by wave 352. The rounded slow modulated square wave 306 will be expressed in the faster signal as well. The longer period but smaller amplitude signal of wave 350 will persist to some extent, even though the fast pulses will have individually mostly dissipated. The remaining slow wave 354 will act on the downstream catalyst.

It is possible to reach the downstream brick with the modulation introduced between the outer and inner loop, referred to herein as feedforward modulation (205). The penalty in doing this is either using a much larger amplitude, leading to NVH, or a longer period so that sustained rich and lean parts of the cycle are long enough to reach deeper into the catalyst, but which will excite the front face of the brick less frequently and will be slow enough to allow the outer loop to suppress the effect. The method described herein addresses both these limitations.

One other detail simplified in FIGS. 2-3 in regard to the feed forward modulation is that bias can be introduced by altering the duty cycle (fraction of a square wave high divided by total period) as well as shifting the signal higher or lower relative to stoichiometric air fuel ratio. The method of FIG. 3 in 303 is largely unaffected by this detail of feed forward modulation (205). In another example, the added modulation of 303 could include a duty cycle modulation, however for simplicity sake is only presented here using a 50% (symmetric) duty cycle.

Turning now to FIG. 4, an example method 400 of catalyst control is shown. The method of FIG. 4 may operate using the control structure of FIG. 3 so as to enable AFR modulation that activates the front face of both an upstream and a downstream exhaust catalyst. Instructions for carrying out method 400 and the rest of the methods included herein may be executed by a vehicle controller (such as controller 12 in FIG. 1) based on instructions stored on a memory of the controller and in conjunction with signals received from sensors of the engine system, such as the sensors described above with reference to FIG. 1. The vehicle controller may employ engine actuators of the engine system to adjust engine operation, according to the methods described below. In one example, the method may be refreshed once every dt seconds (typical dt execution rates are 0.01 to 0.05 seconds).

At 402, vehicle and engine operating conditions are estimated and/or measured at a vehicle controller. The controller acquires measurements from various sensors in the engine system and estimates operating conditions including engine load, engine speed, mass flow upstream of the first catalyst, vehicle torque demand, catalyst temperature, and throttle position.

At 404, the method includes a feed forward (FF) based command of a reference AFR (ref_AFR) offset from stoichiometry (herein referred to as a bias), based on engine operating conditions including engine speed, load, and catalyst temperature (estimated or measured), fuel type, and exhaust mass flow. The controller may refer to look-up tables, indexed as a function of the above-listed parameters, to determine the feedforward command component. The commanded AFR offset may include a lean bias or a rich bias. These biases are selected to produce a desired exhaust gas mixture at the front face of the first (upstream) exhaust catalyst brick. The biases are chosen based on mapping the catalyst system to get the best tradeoff of regulated emissions. The feed-forward mode may be particularly important when the feedgas sensor (e.g., the UEGO sensor upstream of the first catalyst brick) is not yet active to use (such as for a brief duration after engine starts). These bias offsets, are referred to herein as the "original set point."

At 406, the method evaluates the need for mid-brick modulation, based on the rate of change of the feed gas AFR that, if not recurrently detected over a period of time, enables the mid-bed modulation. The method to do this is detailed in FIGS. 5 and 6. Selected conditions are required to be established for the mid-bed modulation to be enabled, the conditions being those where the modulation is a net benefit. During active driving, where the vehicle undergoes frequent accelerations and decelerations (in other words, in the presence of frequent transients), enough disturbances in feed gas AFR may be introduced such that some small but sufficient emissions survive passing through the first brick and are acted on by the downstream brick. If this modulation due to actively driving is adequate, the imposed additional modulation can be reduced or avoided. Once prolonged near steady state mass flow occurs (such as when flow stays within 5% of average flow), where FG AFR sensor is the closest upstream indication of this condition, greater mid-bed modulation is warranted. This condition is detected and mid-bed modulation is selectively enabled which tends to correlate with near steady-state flow conditions. To elaborate further, mid-bed modulation during transients may be suitable for some systems, especially if the downstream catalyst is relatively well loaded and has a larger volume, however on some packages it may be wise to opt out of modulating during transients since catalyst behavior is less certain in transients than in steady state operation.

At 408, if the mid-bed modulation is not enabled, the method will act on 418 and pass the ref_AFR only to 420. If the mid-bed modulation is enabled, the method will act on 410, in which the needed parameters to generate mid-bed modulation, along with ref_AFR, will be passed on to 420.

At 410, the method includes determining the values of various mid-bed modulation parameters based on the estimated operating conditions, including a current mass flow of the system and measured or estimated catalyst brick temperatures. Example mid-bed modulation parameters determined may include a desired period 412, a desired offset in AFR 416, and a square wave magnitude 414 (the absolute value of the amplitude deviation). Typical periods should be 5 to 20 times the FG square wave period, the square wave magnitude will provide +/−0.0005 to +/−0.004 LAM (normalized AFR, where 1.0 is a matched balance of oxidants and reductants), and the offset is preferably 0 but if the chosen magnitude is large and results in the CMS reaching lean conditions where the outer loop feedback controller struggles to regulate at, a small offset (say −0.0005 LAM) may provide the best tradeoff by avoiding too lean a deviation induced by the modulation. FIG. 9 illustrates these choices where the period is 10 seconds, and several example magnitudes are shown providing +/−0.002 and +/−0.004 LAM. No extra offset was used in FIG. 9. In one example, the mid-bed modulation parameters are determined as functions of interpolated look-up tables whose breakpoints are determined by engine/catalyst mapping at steps of mass flows. In the present approach, the square wave is assumed to be symmetrical in duty cycle, and the time allotted to a half of a period is calculated, as elaborated below. An asymmetric square wave in terms of duration of high/low is useful in providing offset bias, as described of the FG modulation, but not as useful here for the downstream target. An asymmetric wave form where there are both asymmetric durations and asymmetric deviation from the mean are possible but require much more complex wave form generation, which does not appear to offer a benefit in this case and will likely create unintended side effects.

In one example, the controller may access lookup tables stored in the controller's memory for determining control parameters of the outer loop feedback controller. In an embodiment, the lookup tables may include a pre-determined table (e.g., a base lookup table) stored in the non-transitory memory of the vehicle controller. The base lookup table may contain a calibration representative of a certified emissions development vehicle equipped with a mature aged catalyst. The base lookup table may be suitable for a range of different aged catalysts, but not necessarily optimal for very new or old catalysts. As an example, the base lookup table may store mass flow rates upstream of the first catalyst and corresponding control parameters.

At 420, the controller generates a periodic signal (for example, a square wave) that modulates the bias command to the outer loop controller at an amplitude and frequency that will tend to penetrate the upstream catalyst so as to reach the mid-bed location and better activate the downstream catalyst. The method to do this is detailed in FIG. 7.

At 422 the square wave periodic signal generated at 420 is altered by the reference governor (305 of FIG. 3) so as to only pass a partial step of the square wave transition, and filters in the remainder of the uncompleted step so as to mitigate any outer loop controller overshoots and possible aggravation of NVH. The method to do this is detailed in FIG. 8.

At 424, the downstream AFR (AFR2) is estimated with a CMS sensor (such as sensor 76 of FIG. 1).

At 426, the difference between the output of 422 and measured 424 generates an error (202) that the outer loop feedback controller (204) will act on and provide a correction. The correction at this point reflects both the feedback controller's rejection of any disturbances detected by the CMS but also now has captured the mid-bed modulation scheduling as generated at 422. The outer loop feedback controller can use various approaches, such as proportional, proportional integral, the method as detailed in U.S. Pat. No. 10,267,202, etc.

At 428 the outer loop feedback controller's command is further processed, by feed forward modulation 205, into a square wave but at a frequency much higher than that of the mid-bed modulation (306) and is intended to stimulate the upstream brick's front face catalytic efficiency. If the existing system were to instead merely make the outer loop controller's bias corrections by shifting the AFR1 slightly lean or rich in the presence of an error created by a disturbance, the system would adhere to original set point, ref AFR. Although achieving the bias target, which is the intended goal of the outer loop control since that is what it can measure with CMS 76, the catalyst activity would be somewhat limited. The catalyst activity is enhanced by the modulation. Therefore higher frequency modulation must address two objectives: control to the bias target and exercising the catalyst to enhance its activation. The control to bias target is achieved by a combination of altering the high frequency square wave's average shift up or down in AFR and adjusting the square wave's duty cycle, i.e. the amount of dwell time within the period where the square wave is either predominately lean or rich (an asymmetric duty cycle). The exercising, and thus activation, of the highly loaded upstream brick is primarily dependent on the square wave's amplitude and period. For example the amplitude may vary between as little as +/−0.005 LAM and as much as +/−0.03 LAM, and the period as little as 0.5 seconds and as much as 2 seconds. The mid-bed modulation, via the 202 signal acted on by the outer loop controller, in now expressed in the higher frequency square wave along with the two existing objectives of rejecting disturbances and stimulating the upstream brick's front face. To summarize, the system may have two superimposed modulated signals at work simultaneously: one interacting with the feed-gas at the front face of the first brick and another interacting further into the catalyst to increase activity on the downstream brick(s).

At 430, the controller measures the feed gas AFR1. AFR1, as far as this method is concerned, is required for both 406 and to 432.

At 432, the difference (207) of the high frequency square wave from 428 and the measured AFR1 from 430 is input to inner loop feedback controller 208. This inner loop controller can be another proportional, proportional-integral, a method such as U.S. Pat. No. 7,987,840, etc. The inner loop is much faster a control loop than the outer loop, where the inner loop can track the high frequency square wave generated by 428 at 207. The outer loop can only respond to the high frequency square wave 207 as a mean average of its signal, but it will track the lower frequency mid-bed modulation signal, such as 306.

Finally at 434, the existing system completes the path to allow the method explained here to impact the exhaust gas. The path requires that the inner loop control reject feed gas disturbances by trimming the open loop estimated fuel injection (209), schedule various injection events, and inject/combust the fuel at 212.

Figure 5:
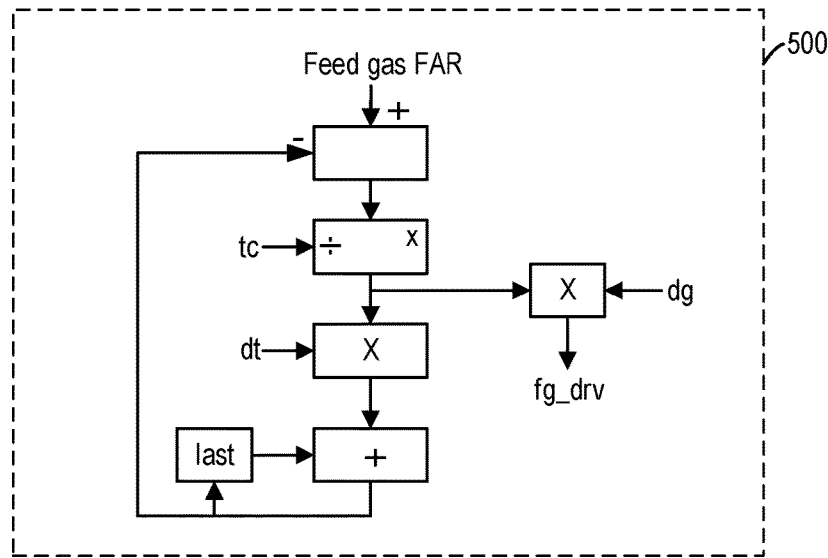
FIG. 5 shows an example derivative filtering of feed gas air fuel ratio.

Turning now to FIG. 5, example method 500 that details the method as described in 406. The method includes measuring a feed gas AFR1, such as via an oxygen sensor coupled upstream of all exhaust catalyst bricks. The method further includes filtering the measured feed gas AFR to create a pulse proportional to rate of change of feed gas AFR1. As elaborated at the control structure 500 of FIG. 5, the controller applies a simple derivative type filter operation that low pass filters, with a time constant (tc), the measured feed gas AFR1. The controller then takes a difference between the samples and multiplies this by a gain (dg). This dynamic function strips out any offset, centering the signal about 0, and creates a pulse, labeled fg_drv, proportional to the rate of change of the change feed gas AFR.

Figure 6:
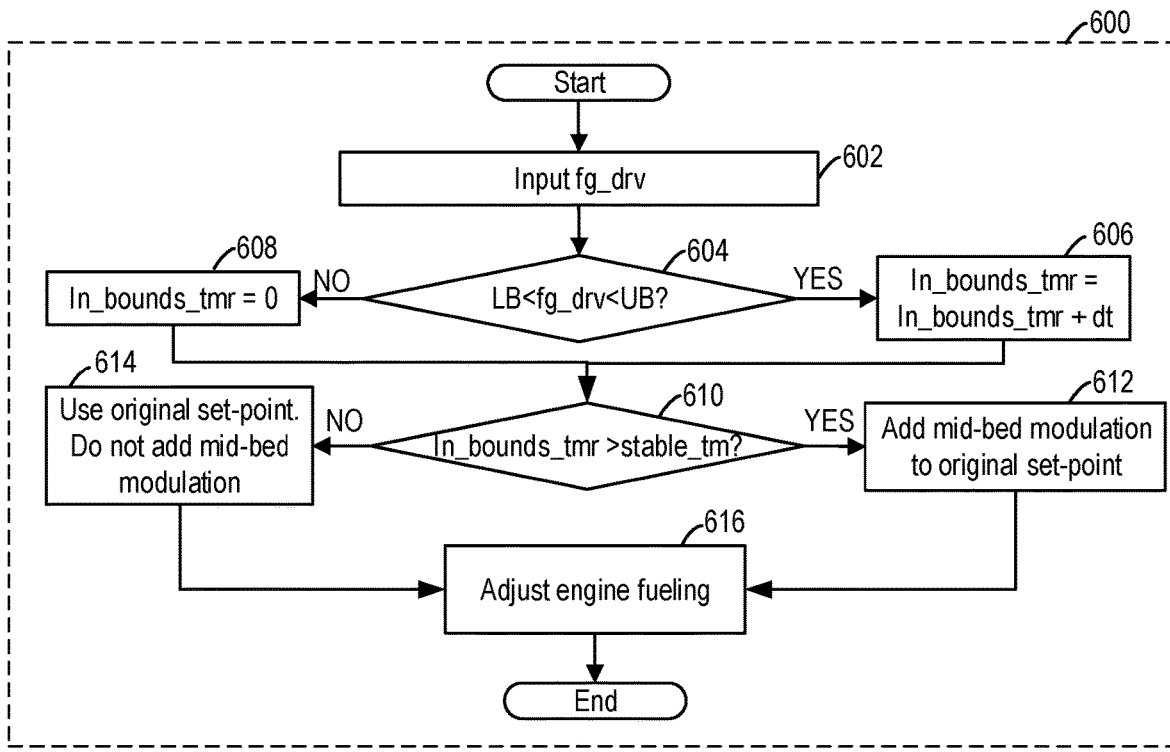
FIG. 6 shows an example of detecting sufficient steady exhaust feed gas control to enable a downstream catalyst modulation.

Turning to FIG. 6, method 600, at 604, the controller checks the derivative of the feed gas AFR (that is, rate of change of feed gas AFR over time or fg_drv), and compares this to an upper (positive number) and lower (negative number) bound. The bounds that are chosen depend on the value of dg. In FIG. 10, the example traces are based on setting dg=0.1 and setting the bounds to either +/−0.005 (a permissive setting) to +/−0.003 (a more restrictive setting). If the derivative stays between the upper bound (UB) and the lower bound (LB), then at 606, the controller allows a timer, in_bounds_tmr, to advance. Else, if the derivative exceeds either the UB or LB, then at 608, the timer resets. From each of 606 and 608, the method then moves to 610, wherein the controller checks the in_bounds_tmr and determines if has exceeded a threshold time, stable_tm. The stable_tm (in example, set to 30 sec) and the bounds are selected based on vehicle test data, as illustrated by FIG. 10. The objective is for sustained near steady state operation to keep the mid-bed modulation enabled but to avoid the modulation if the drive has many transients. The true indication of enablement needed is what the method as described in 500 and 600 evaluates in terms of exhaust AFR deviations, but FIG. 10 provides an indication of how this correlates to different driving styles, which is relevant to emissions control developers. If the timer has exceeded the threshold time, then at 612, the controller will allow the mid-bed modulation to be added to the original catalyst set point (that is, an existing value that does not include mid-bed modulation). Otherwise at 614, mid-bed modulation is not performed and the original set point is maintained. Engine fueling then adjusted in accordance at 616 and results in operation as described by FIG. 2.

Figure 7:
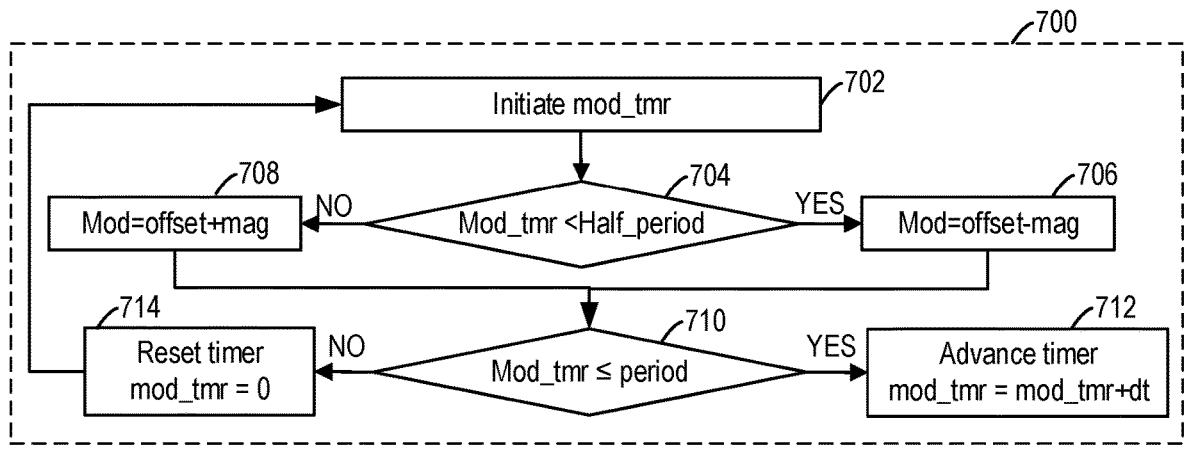
FIG. 7 shows an example of generating a downstream catalyst modulation square wave.

Turning now to FIG. 7, method 700 details step 420 of FIG. 4, which is performed at 303 of FIG. 3. At step 702, method 700 includes initiating the modulation timer (mod_tmr). At 704, it is determined if the timer is half way through the timer advancement. If yes, then at 706, the square wave output is set to a value of (offset−magnitude). Else, at 708, the square wave output is set to a value of (offset+magnitude). As such, the mid-bed modulation can be limited or effectively turned off based on mass flow through the exhaust, where either or both the offset and magnitude are set to small or even zero values. Note that original set point generated at 201 is added to the value of Mod from either 706 or 708 in order to generate signal 304.

Figure 8:
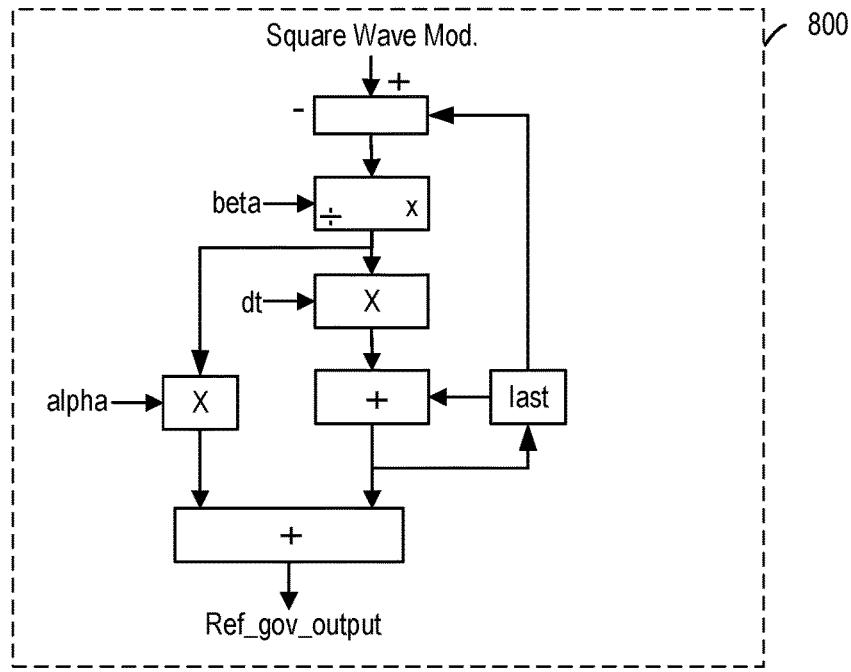
FIG. 8 shows an example filtering of the downstream catalyst modulation signal.

Turning now to FIG. 8, method 800 details step 422 of FIG. 4, which is performed at 305 of FIG. 3, wherein the controller processes the catalyst set point by limiting the square wave step changes. The dynamic filter, essentially a form of a lag/lead discrete filter, may have two parameters that can be empirically chosen, or can be analytically calculated based on a dynamic characterization of the outer loop. Method 800 depicts a processing based on a factor of pure delay, where an alpha term is the delay multiplied by a factor that is greater than 1.0, and a beta term is several times larger than the alpha. Method 800 essentially allows only a fraction of a step of the square wave to immediately be acted on, essentially an alpha/beta fraction, where the remainder of the magnitude is filtered with a time constant of beta. If delay was 0, then the square wave would simply pass through. Small delays would have a very minor "softening" of the signal. The pure delay in the outer loop varies with mass flow, where at low mass flows, near engine idle, the delay may be 5-10 seconds long and at higher flows less than 1 second. Typical values of alpha and beta at low flows are 10 and 20, and at high flows are 1 and 2, respectively. These values can be entered into lookup tables that map mass flow to alpha and beta. A more rigorous system identification method of these parameters can be found in U.S. Pat. No. 10,267,202, but this requires additional testing and the method of U.S. Pat. No. 10,267,202 must be at least in part implemented in the controller. Rougher approximations are sufficient so that any otherwise viable outer loop feedback controller (such as controller 204 of FIG. 2) can be used. The method of FIG. 8 enables the signal to be contained so that set point changes do not cause unintended overshoots. Example plots of mid-bed activity showing the result of this processing are described herein at FIG. 9 (traces 934 and 964).

FIG. 9 shows the mid-bed modulation at work in a test vehicle, instrumented as shown in FIG. 3. Three levels of modulation are depicted: none, moderate, and large, at maps 900, 930, and 960, respectively. For each level of modulation, the signal traces for feed gas (plots 901-02, 931-32, 961-62), mid-bed (plots 904-05, 934-35, 964-65), and downstream of the last brick (also termed tail pipe) (plots 906, 936, 966) are shown.

Map 900, including a first set of plots for no mid-bed modulation, depicts a feed gas command signal at plot 901 and the UEGO observed response at plot 902. Both signals are in normalized fuel air ratio (referred to as units of PHI, the reciprocal of LAM, so a LAM of 0.9999 is equivalent to 1.0001 PHI). The square wave is essentially held at 50% duty cycle and is centered about 1.00 (Stoichiometry), where the square wave operates at +/−0.03 phi or +/−3% rich/lean. Map 900 further depicts a mid-bed modulation command, in phi, at plot 904, which is depicted herein as a flat signal. CMS voltage is shown at plot 905. As can be seen, CMS voltage varies with the feed gas modulation but is greatly attenuated. In voltage this signal is +/−0.005 volts, which corresponds to roughly +/−0.001 phi or less. The attenuation from feed gas to mid-bed is in the order of 97 to 98%. Plot 906 depicts voltage from a CMS sensor located after both bricks, referred to herein as a tail-pipe location. It will be appreciated that the extra CMS HEGO at the tailpipe location is not necessarily included as part of the method, rather, it is only an instrumentation sensor used to observe the resulting downstream brick's operation and is therefore not shown in FIGS. 1-3. The voltage ripple is similar, but the actual phi ripple is, due to the non-linearity of the CMS, smaller still, perhaps half of mid-bed phi range.

Map 930, including a second set of plots, depicts a moderate level of mid-bed modulation. Plots 931-32 shows the feed gas modulation tracking the mid-bed modulation as well as imposing the fast modulation. This implementation achieves bias via both duty cycle adjustment and level shift relative to stoichiometry, so the feed gas signals show a thicker/thinner rich side pulse as well as the entire signal shifting up and down. Plots 934-35 show the mid-bed commanded phi, with the CMS voltage superimposed on it. The feed gas modulation signal still exists, as seen by the fastest ripple, but this rides on the mid-bed modulation as intended. Plot 936 shows the tail pipe voltage, in which the amplitude did not increase, but actually was suppressed on the lean side.

Map 960, including a third set of plots, depicts a still larger modulation amplitude, at this point possibly too excessive, but nonetheless demonstrates the method of a mid-bed modulation.

FIG. 10 shows an example processing of vehicle data with the method 406 and of FIGS. 5-6 to determine if sufficient conditions are present to enable mid-bed modulation. Three different drive cycles are shown at maps 1000 (including plots 1002-1005), 1010 (including plots 1012-1015) and 1020 (including plots 1022-1025). Map 1000 depicts an FTP bag 1 and 2 which is equivalent to a city drive, map 1010 depicts a highway cruise, and map 1020 depicts a set of steady state vehicle speeds where the only drive induced disturbances occur when the vehicle is accelerated or decelerated to a vehicle speed plateau. For each drive, a wide and a narrow range of bounds are considered. The wide bounds include +/−0.005 phi and are shown at plots 1002, 1012, 1022. The narrow bounds include +/−0.003 phi and are shown at plots 1004, 1014, 1024. Post CMS modulation is enabled after each bound is completed. Post CMS modulation after the wide bounds is shown at plots 1003, 1013, and 1023. Post CMS modulation after the narrow bounds is shown at plots 1005, 1015, and 1025.

As can be seen by comparing the wider bounds to the narrower bounds, the wider bounds allow for more mid-bed modulation on active driving, and the narrower bounds permit less. However, the fixed speed cruise tests, with either set of the bounds, receive mid-bed modulation except for vehicle speed changes to reach the next plateau. This indicates that the method, unless the developers choose to turn it off for all drives, will be exercised to some extent on almost any drive, whether an active cycle or the other extreme of a fixed load road drive. The method can be tuned to the level of mid-bed modulation that suites a vehicle's emissions requirements and capabilities, where the enablement is based on the most immediately relevant measurement overall, feed gas AFR.

In this way, a mid-bed fuel air ratio modulation may be used to activate both an upstream and a downstream catalyst brick. The technical effect of imposing an additional slow-acting periodic wave signal to an existing fast-acting catalyst modulation wave signal is that the fast wave can carry the slow wave so allow for sufficient downstream catalyst activation. By enabling the mid-bed modulation selectively during steady-state conditions, fuel economy and emissions may be better balanced. In addition to improving final "tailpipe" emissions, the selective nature of enabling the mid-bed modulation based on lack of deviation of feed gas AFR and of being able to moderate the amount of mid-bed modulation used based on mass flow (adjusting the amplitude, period, and bias) minimizes the expenditure of additional fuel used to keep the downstream brick hot. The energy to keep the catalyst hot and therefore active is derived from other sources. For example, automotive systems may be designed to leverage waste heat in the combustion/exhaust. However, waste heat alone is not sufficient to warm the catalyst to provide the best of the catalyst capabilities. The technical advantage of the modulation approach described herein is that fuel used to modulate the catalyst bricks can be minimized while providing sufficient activation of both upstream, and downstream catalyst bricks.

As one example, a method comprises: during near steady exhaust mass flow conditions, adjusting an engine combustion air-fuel ratio responsive to a first exhaust gas sensor upstream of a first and a second three-way catalyst, and a second exhaust gas sensor between the first and the second catalyst, including introducing modulation to a reference set-point compared with feedback from the second sensor, at a frequency slower than modulation generated from feedback from the first sensor. In the preceding example, additionally or optionally, the adjusting the cylinder air-fuel ratio is performed without feedback from any exhaust gas oxygen sensor downstream of the second catalyst. In any or all of the preceding examples, additionally or optionally, the method further comprises, during non-steady mass flow conditions that result in upstream air/fuel deviations, adjusting the cylinder air-fuel ratio without introducing the modulation. In any or all of the preceding examples, additionally or optionally, the reference set-point is determined based on engine speed and load. In any or all of the preceding examples, additionally or optionally, the steady upstream exhaust air/fuel ratio include a lower boundary of air-fuel ratio rate of change, and wherein the upstream exhaust air/fuel ratio include a upper boundary of air-fuel ratio rate of change. In any or all of the preceding examples, additionally or optionally, the modulation is at an amplitude such that lean and rich excursions, relative to the reference set-point translate at least a threshold distance into the second catalyst, downstream of the first catalyst, but not into exhaust downstream of the second catalyst. In any or all of the preceding examples, additionally or optionally, the lean and rich excursions in the first catalyst are larger than corresponding lean and rich excursions in the second catalyst. In any or all of the preceding examples, additionally or optionally, the method further comprises determining control parameters of the modulation in response to the temperature of the second catalyst. In any or all of the preceding examples, additionally or optionally, introducing the modulation includes filtering the reference set-point with parameters dependent on delay based on engine operating conditions including engine speed and load; and adjusting engine cylinder fueling based on a difference between the filtered reference set-point and feedback from the second sensor so as to oscillate an air-fuel ratio at the first and second exhaust catalyst about the reference set-point.

Another example method comprises: fueling an engine in accordance with a periodic signal that generates a higher than threshold air-fuel ratio oscillation at each of a first, upstream exhaust catalyst brick and a second, downstream exhaust catalyst brick, parameters of the periodic signal adjusted responsive to mass flow through the engine exhaust. In any or all of the preceding examples, additionally or optionally, the air-fuel ratio oscillation includes lean and rich air-fuel ratio excursions relative to a reference set-point, and wherein the oscillation dampens during passage through the first and second catalyst brick such that the air-fuel ratio is at the reference set-point downstream of the second catalyst brick. In any or all of the preceding examples, additionally or optionally, responsive to upstream exhaust air-fuel ratio rate of change remaining below a upper (positive) threshold, the parameters of the periodic signal are feedforward adjusted as a first function of engine speed and load, and feedback adjusted as a function of feed gas air-fuel ratio. In any or all of the preceding examples, additionally or optionally, the method further comprises, responsive to upstream exhaust air-fuel ratio rate of change remaining above a lower (negative) threshold, the parameters of the periodic signal are feedforward adjusted as the first function of engine speed and load, and feedback adjusted as a function of a mid-bed air-fuel ratio. In any or all of the preceding examples, additionally or optionally, the parameters of the periodic signal include an amplitude and a frequency of the periodic signal, and wherein the frequency of the periodic signal measured at mid-bed air-fuel ratio is slower than the frequency of the periodic signal measured at feed gas air-fuel ratio. In any or all of the preceding examples, additionally or optionally, the feed gas air-fuel ratio is sensed by a first exhaust gas oxygen sensor coupled upstream of the first catalyst brick, and wherein the mid-bed air-fuel ratio is sensed by a second exhaust gas oxygen sensor coupled in a mid-bed region in between the first and the second catalyst bricks. In any or all of the preceding examples, additionally or optionally, the method further comprises filtering the periodic signal with parameters dependent on delay at a reference governor before fueling the engine in accordance with the filtered periodic signal, the parameters dependent on delay selected as a function of exhaust mass flow. In any or all of the preceding examples, additionally or optionally, an amplitude of the air-fuel ratio oscillation at the first catalyst brick is larger than the amplitude of the air-fuel ratio oscillation at the second catalyst brick.

Another example system comprises: an engine with a plurality of cylinders; a mass air flow sensor coupled to an engine intake; cylinder fuel injectors; an exhaust passage with a first catalyst brick coupled upstream of a second catalyst brick; a first oxygen sensor coupled upstream of the first catalyst brick for sensing a feedgas air-fuel ratio; a second oxygen sensor coupled in between the first and second catalyst brick for sensing a mid-bed air-fuel ratio; and a controller with computer-readable instructions stored on non-transitory memory that when executed cause the controller to: responsive to upstream exhaust air-fuel ratio rate of change remaining below an upper (positive) threshold and remaining above a lower (negative) threshold, command a square wave having control parameters selected based on exhaust mass flow and catalyst temperature to generate an air-fuel ratio oscillation with the first offset about the reference set-point a the first catalyst brick and another air-fuel ratio oscillation with a second, smaller offset about the reference set-point at the second, downstream exhaust catalyst brick; and adjust engine fueling in accordance with the commanded square wave. In any or all of the preceding examples, additionally or optionally, the square wave is a symmetrical wave, and wherein control parameters of the square wave are further feed-forward selected based on engine speed, and engine load. In any or all of the preceding examples, additionally or optionally, adjusting engine fueling includes: filtering the commanded square wave with parameters dependent on delay that is an estimated pure dead time response of the exhaust path from cylinder injection to AFR measured at a second oxygen sensor coupled in between the first and second catalyst brick which may be a function of exhaust mass flow; and adjusting a duty cycle commanded to the cylinder fuel injectors based on the filtered commanded square wave.

In another representation, the engine system is coupled in a hybrid electric vehicle system or autonomous vehicle system. In a further representation, a method comprises: responsive to upstream exhaust air-fuel ratio rate of change remaining below an upper (positive) threshold and remaining above a lower (negative) threshold, adjust engine fueling in accordance with a second periodic signal to generate the air-fuel ratio oscillation about stoichiometry at each of the first, upstream exhaust catalyst brick and a second, downstream catalyst brick.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during near steady exhaust air-fuel ratio conditions, adjusting a cylinder air-fuel ratio responsive to a first exhaust gas sensor upstream of a first and a second three-way catalyst, and a second exhaust gas sensor between the first and the second catalyst, including introducing modulation to a reference set-point compared with feedback from the second sensor, at a frequency slower than modulation generated from feedback from the first sensor.

2. The method of claim 1, wherein the adjusting the cylinder air-fuel ratio is performed without feedback from any exhaust gas oxygen sensor downstream of the second catalyst.

3. The method of claim 1, further comprising, during conditions with larger than threshold upstream air-fuel ratio deviations as measured by the first sensor, adjusting the cylinder air-fuel ratio without introducing the modulation to the reference set-point for the second sensor.

4. The method of claim 1, wherein the reference set-point is based on engine speed and load.

5. The method of claim 1, wherein the near steady exhaust air fuel ratio conditions include an upstream exhaust air-fuel ratio rate of change below an upper threshold and above a lower threshold.

6. The method of claim 1, wherein the modulation is at an amplitude such that lean and rich excursions, relative to the reference set-point, translate at least a threshold distance into the second catalyst, downstream of the first catalyst, but not into exhaust downstream of the second catalyst.

7. The method of claim 6, wherein the lean and rich excursions in the first catalyst are larger than corresponding lean and rich excursions in the second catalyst.

8. The method of claim 1, further comprising determining control parameters of the modulation including amplitude, frequency, and offset responsive to the exhaust mass flow and the temperature of the second catalyst.

9. The method of claim 1, wherein introducing the modulation includes:
filtering a sum of the reference set-point and a periodic signal with filter parameters that alter filter response, the filter parameters depending on exhaust path pure delay; and
adjusting cylinder fueling based on a difference between the filtered sum of the reference set-point and periodic signal and feedback from the second sensor so as to modulate the cylinder air-fuel ratio at the first and second catalyst about the reference set-point.

10. A method, comprising:
fueling an engine in accordance with a periodic signal that generates a larger than threshold air-fuel ratio modulation at each of a first, upstream exhaust catalyst brick and a second, downstream exhaust catalyst brick, parameters of the periodic signal adjusted responsive to exhaust mass flow and a temperature of the second catalyst brick, wherein the air-fuel ratio modulation includes lean and rich air-fuel ratio excursions relative to a reference set-point, and wherein the modulation dampens during passage through the first and second catalyst brick such that the air-fuel ratio is at the reference set-point downstream of the second catalyst brick.

11. The method of claim 10, wherein responsive to an exhaust air-fuel ratio rate of change, sensed upstream of the first catalyst brick, remaining below an upper positive threshold, feedforward adjusting the parameters of the periodic signal as a function of the exhaust mass flow and second catalyst brick temperature.

12. The method of claim 11, further comprising, responsive to the exhaust air-fuel ratio rate of change remaining above a lower negative threshold, feedforward adjusting the parameters of the periodic signal as the function of exhaust mass flow.

13. The method of claim 12, wherein the parameters of the periodic signal include an amplitude and a frequency of the periodic signal, and wherein the frequency of the periodic signal reaching a mid-bed air-fuel ratio is slower than the frequency of the periodic signal in the feed gas air-fuel ratio.

14. The method of claim 13, wherein the feed gas air-fuel ratio is sensed by a first exhaust gas oxygen sensor coupled upstream of the first catalyst brick, and wherein the mid-bed air-fuel ratio is sensed by a second exhaust gas oxygen sensor coupled in a mid-bed region in between the first and the second catalyst bricks.

15. The method of claim 13, wherein an amplitude of the air-fuel ratio oscillation at the first catalyst brick is larger than the amplitude of the air-fuel ratio oscillation at the second catalyst brick.

16. The method of claim 12, wherein the parameters of the signal are a first set of parameters, and wherein fueling the engine with the periodic signal includes filtering the periodic signal with a reference governor using a second set parameters that alter the filter response as a function of an exhaust path pure delay before fueling the engine in accordance with the filtered periodic signal.

17. A system, comprising:
an engine with a plurality of cylinders;
a mass air flow sensor coupled to an engine intake;
cylinder fuel injectors;
an exhaust passage with a first catalyst brick coupled upstream of a second catalyst brick;
a first oxygen sensor coupled upstream of the first catalyst brick for sensing a feed gas air-fuel ratio;
a second oxygen sensor coupled in between the first and second catalyst brick for sensing a mid-bed air-fuel ratio; and
a controller with computer-readable instructions stored on non-transitory memory that when executed cause the controller to:
responsive to upstream exhaust air-fuel ratio rate of change remaining below an upper positive threshold and above a lower negative threshold, command a square wave having control parameters, including amplitude and frequency, based on exhaust mass flow and catalyst temperature to generate an air-fuel ratio oscillation with a first offset about a reference set-point at the first catalyst brick and another air-fuel ratio oscillation with a second offset about the reference set-point, smaller than the first offset, at the second, downstream exhaust catalyst brick; and
adjust engine fueling in accordance with the commanded square wave.

18. The system of claim 17, wherein the square wave is a symmetrical wave, and wherein the controller includes further instructions to: further feed-forward select the control parameters of the square wave based on the exhaust mass flow and the catalyst temperature, the catalyst temperature including at least the temperature of the second catalyst brick.

19. The system of claim 17, wherein adjusting engine fueling includes:
filtering the commanded square wave with additional parameters that alter the filter response, the additional parameters dependent on the exhaust path pure delay, the delay based on engine operating conditions including exhaust mass flow; and adjusting a duty cycle commanded to the cylinder fuel injectors based on the filtered commanded square wave.

* * * * *